US010462215B2

United States Patent
Gill et al.

(10) Patent No.: US 10,462,215 B2
(45) Date of Patent: *Oct. 29, 2019

(54) SYSTEMS AND METHODS FOR AN INTELLIGENT DISTRIBUTED WORKING MEMORY

(71) Applicant: Microsoft Technology Licensing, LLC, Redmond, WA (US)

(72) Inventors: Deepinder S. Gill, Hyderabad (IN); Vipindeep Vangala, Hyderabad (IN); Govind Saoji, Hyderabad (IN)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/203,415

(22) Filed: Nov. 28, 2018

(65) Prior Publication Data
US 2019/0098075 A1 Mar. 28, 2019

Related U.S. Application Data

(63) Continuation of application No. 15/339,222, filed on Oct. 31, 2016, now Pat. No. 10,171,563.

(51) Int. Cl.
| G06F 16/27 | (2019.01) |
| H04L 29/08 | (2006.01) |
| G06F 16/23 | (2019.01) |
| G06F 16/901 | (2019.01) |
| G06F 16/907 | (2019.01) |

(52) U.S. Cl.
CPC .............. *H04L 67/10* (2013.01); *G06F 16/23* (2019.01); *G06F 16/27* (2019.01); *G06F 16/907* (2019.01); *G06F 16/9024* (2019.01)

(58) Field of Classification Search
CPC ..... H04L 67/1097; H04L 67/10; G06F 3/065; G06F 3/0605; G06F 3/0629; G06F 3/067; G06F 17/30002; G06F 17/30283; G06F 17/30958
USPC ....................................................... 711/148
See application file for complete search history.

(56) References Cited

U.S. PATENT DOCUMENTS

| 5,964,834 | A | * | 10/1999 | Crutcher | ................. | G06F 9/543 |
| | | | | | | 709/213 |
| 7,870,493 | B2 | * | 1/2011 | Pall | ........................ | G06F 9/543 |
| | | | | | | 715/751 |
| 8,555,187 | B2 | * | 10/2013 | Margolin | ................ | H04L 67/10 |
| | | | | | | 715/748 |
| 8,762,401 | B2 | * | 6/2014 | Waggoner | ........... | G06F 16/2423 |
| | | | | | | 707/758 |
| 2012/0096368 | A1 | * | 4/2012 | McDowell | .............. | G06F 9/543 |
| | | | | | | 715/748 |
| 2014/0025727 | A1 | * | 1/2014 | Ahn | .................... | H04L 67/1095 |
| | | | | | | 709/203 |
| 2014/0157169 | A1 | * | 6/2014 | Kikin-gil | ................ | G06F 9/543 |
| | | | | | | 715/770 |

(Continued)

*Primary Examiner* — Hua J Song

(57) ABSTRACT

Systems and methods for intelligent memory sharing and contextual retrieval across multiple devices and multiple applications are provided. The systems and methods do not just show a user what he or she has stored across his or her different devices but intelligently suggests relevant topics and/or information based on what is contained in a shared working memory compiled from the temporary memories on all of the user devices.

20 Claims, 11 Drawing Sheets

(56) References Cited

U.S. PATENT DOCUMENTS

2014/0267339 A1\* 9/2014 Dowd ................ H04L 63/0428
                                                 345/581
2015/0012861 A1\* 1/2015 Loginov ................ G06F 9/543
                                                 715/770

\* cited by examiner

US 10,462,215 B2

SYSTEMS AND METHODS FOR AN INTELLIGENT DISTRIBUTED WORKING MEMORY

This application is a continuation of U.S. patent application Ser. No. 15/339,222, filed on Oct. 31, 2016, now U.S. Pat. No. 10,171,563, issued Jan. 1, 2019, which is incorporated herein by reference in its entirety for all that it teaches and for all purposes.

BACKGROUND

The current trend in computing is away from mainframe systems toward cloud computing. Cloud computing is Internet-based computing, whereby shared resources such as software and other information are provided to a variety of computing devices on-demand via the Internet. It represents a new consumption and delivery model for IT services where resources are available to all network-capable devices, as opposed to older network models where resources were stored locally across the devices. The move toward cloud computing opens up a new potential for mobile and other networked devices to work in conjunction with each other to provide greater interaction and a much richer experience with respect to third party and a user's own resources.

Cloud computing offers enhanced connectivity between a user's various devices, such as smart phones, Internet-connected television or set-top boxes, laptops, netbooks, and desktop computers. Despite this enhanced connectivity, where a user wishes to transfer data and user context between devices, the user is still forced to perform a series of complex tasks.

It is with respect to these and other general considerations that aspects disclosed herein have been made. Also, although relatively specific problems may be discussed, it should be understood that the aspects should not be limited to solving the specific problems identified in the background or elsewhere in this disclosure.

SUMMARY

In summary, the disclosure generally relates to intelligent memory sharing and contextual retrieval across multiple devices and/or multiple applications of a user. As such, the systems and methods as disclosed herein do not just show a user what he or she has stored across his or her different devices but intelligently suggests relevant topics or information based on what is contained in a shared working memory compiled from the temporary memories on all of the user devices. The ability of the systems and methods described herein to intelligently suggests relevant topics or information based on the shared working memory of the user improves a user's ability to accomplish tasks, improves the recall of needed memory items, improves the usability, improves the performance, and/or improves user interactions of/with the users devices when compared to previously utilized systems or methods that do not intelligently suggest relevant topics or information based on a shared working memory of the user.

One aspect of the disclosure is directed to a system for intelligent memory sharing and contextual retrieval across multiple devices and multiple applications of a user. The system includes at least one processor and a memory. The memory encodes computer executable instruction that, when executed by the at least one processor, are operative to:

maintain a shared working memory of the user for temporary storage of information until an occurrence of a condition;
collect data from working memories of any device associated with the user;
store the data on the shared working memory;
collect an intelligence framework;
store the intelligence framework on the shared working memory;
analyze the data to determine elements listed within the data utilizing world knowledge;
enrich the elements utilizing world knowledge to form enriched elements;
determine a user context based on the enriched elements;
store the enriched elements and the user context in the shared working memory;
send an update to all active devices of the of the user regarding changes to the shared working memory;
analyze the intelligence framework based on the user context;
determine a response based the analysis of the intelligence framework and the world knowledge;
compare the response to a relevancy threshold;
determine that the response meets the relevancy threshold;
send the response to all the active devices of the user and store the response in the shared working memory, upon making the determination that the response meets the relevancy threshold;
determine that the condition occurred; and
in response to the occurrence of the condition, delete all information stored on the shared working memory.

Another aspect of the disclosure is directed to a system for intelligent memory sharing and contextual retrieval across multiple devices and multiple applications of a user. The system includes at least one processor and a memory. The memory encodes computer executable instruction that, when executed by the at least one processor, are operative to:

maintain a shared working memory of the user for temporary storage of information until an occurrence of a condition;
collect data from working memories of any device associated with the user;
store the data on the shared working memory;
collect enriched elements for the data formed utilizing world knowledge and a user centric memory graph;
collect a user context;
store the enriched elements and the user context in the shared working memory;
send an update to all active devices of the of the user regarding changes to the shared working memory;
identify relevant elements on the user centric memory graph based on the enriched elements and the user context to form a constrained user centric memory graph;
determine a response based the constrained user centric memory graph and the world knowledge;
compare the response to a relevancy threshold;
determine that the response meets the relevancy threshold;
send the response to all the active devices of the user and store the response in the shared working memory, upon making the determination that the response meets the relevancy threshold.
delete the shared working memory after the occurrence of the condition.

The user centric memory graph links user memory elements based on relationships created in space, time, and cognitive dimensions of the user.

Yet another aspect of the disclosure includes a method for intelligent memory sharing and contextual retrieval across multiple devices and multiple applications of a user. The method includes:

maintaining a shared working memory of the user for temporary storage of information for a predetermined amount of time; and deleting the shared working memory after the predetermined amount of time.

During the predetermined amount of time the following steps are performed:

collecting data from working memories of any device associated with the user;

storing the data on the shared working memory;

analyzing the data to determine elements listed within the data;

collecting an intelligence framework for the user;

enrich the elements utilizing world knowledge to form enriched elements;

collecting a user context;

storing the enriched elements, the intelligence framework, and the user context in the shared working memory;

sending an update to all active devices of the of the user regarding changes to the shared working memory;

identifying relevant elements on the intelligence framework based on the enriched elements and the user context to form a constrained intelligence framework;

determining a response based the constrained intelligence framework and the world knowledge;

comparing the response to a relevancy threshold;

determining that the response meets the relevancy threshold; and sending the response to all the active devices of the user and store the response in the shared working memory upon making the determination that the response meets the relevancy threshold.

This summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Non-limiting and non-exhaustive embodiments are described with reference to the following Figures.

DETAILED DESCRIPTION

Figure 1A:
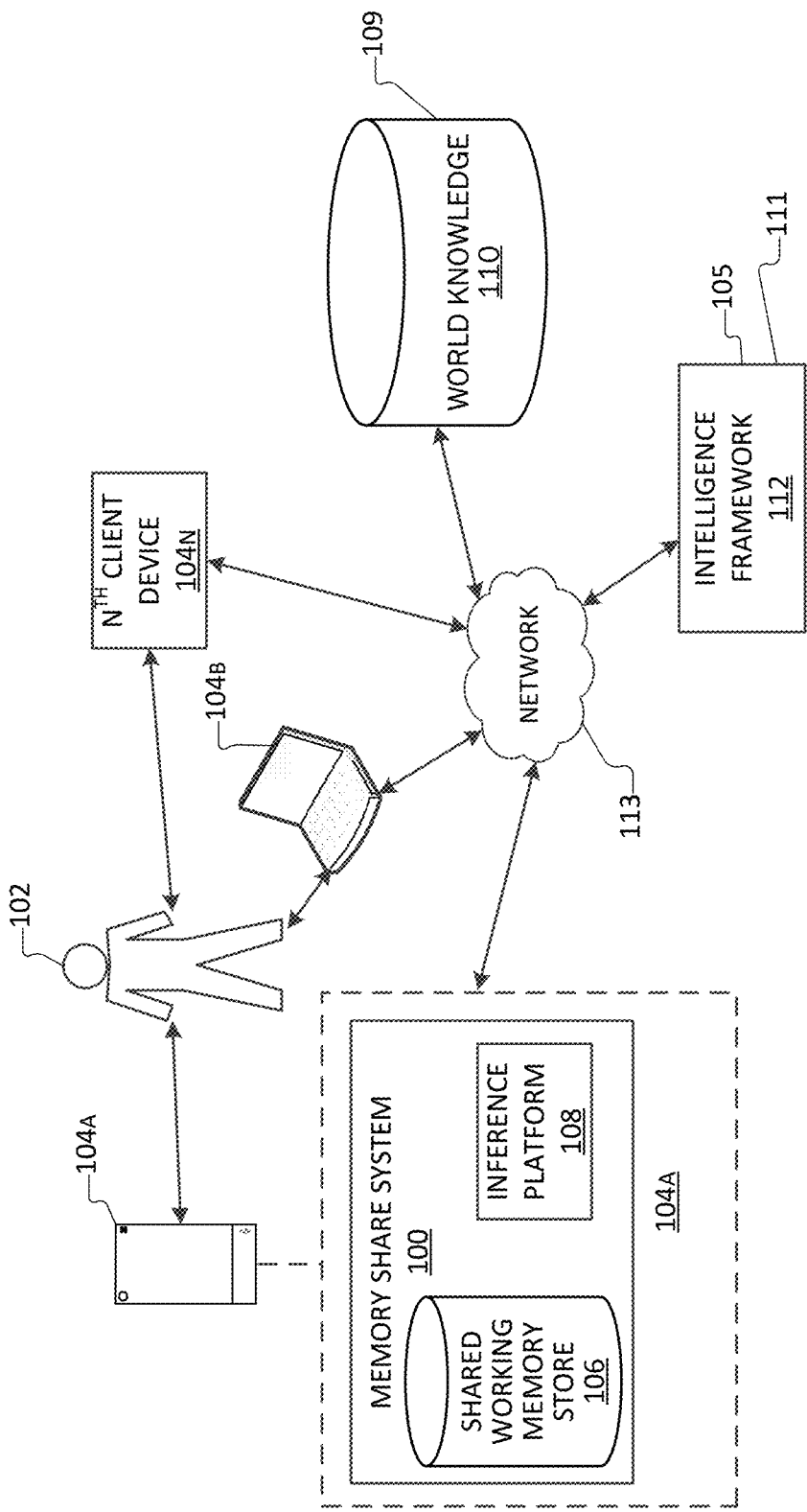
FIG. 1A is a schematic diagram illustrating a memory share system on a client computing device, in accordance with aspects of the disclosure.

In the following detailed description, references are made to the accompanying drawings that form a part hereof, and in which are shown by way of illustrations specific aspects or examples. These aspects may be combined, other aspects may be utilized, and structural changes may be made without departing from the spirit or scope of the present disclosure. The following detailed description is therefore not to be taken in a limiting sense, and the scope of the present disclosure is defined by the claims and their equivalents.

Cloud computing offers enhanced connectivity between a user's various devices, such as smart phones, Internet-connected television or set-top boxes, laptops, netbooks, and desktop computers. Despite this enhanced connectivity, where a user wishes to transfer data and user context between devices, the user is still forced to perform a series of complex tasks. Further, there is no way for multiple devices to intelligently share their temporary or working memories for providing response generation.

Currently, language understanding systems, personal digital assistants, agents and artificial intelligence are utilized to communicate with user and/or to complete basic tasks. While these previously utilized systems can help track individual snippets of information, these previously utilized systems have not been harnessed to analyze the working memories from all the different devices associated with a user to generate relevant topics or information for the user. Additionally, these previously utilized systems and methods do not utilize intelligence frameworks to suggest relevant information or topics to the user based on the compiled data from the working memories of the user devices. As such, these previously utilized systems have limited recall, only snippet specific recall, and/or intelligent frameworks that were not user centric and that were not based on the temporary memory of all the users devices.

Therefore, systems and methods for intelligent memory sharing and contextual retrieval across multiple devices and/or multiple applications of a user are disclosed herein. As such, the systems and methods as disclosed herein do not just show a user what he or she has stored across his or her different devices but intelligently suggests relevant topics or information based on what is contained in a shared working memory compiled from the temporary memories on all of the user devices. The ability of the systems and methods described herein to intelligently suggests relevant topics or information based on the shared working memory of the user improves a user's ability to accomplish tasks, improves the recall of needed memory items, improves the usability, improves the performance, and/or improves user interactions of/with the users devices when compared to previously utilized systems or methods that do not intelligently suggest relevant topics or information based on a shared working memory of the user. In contrast, previously utilized memory share systems only compiled and shared data from the working memories of the different user device and did not suggest relevant topics or information based on this compiled data.

Figure 1B:
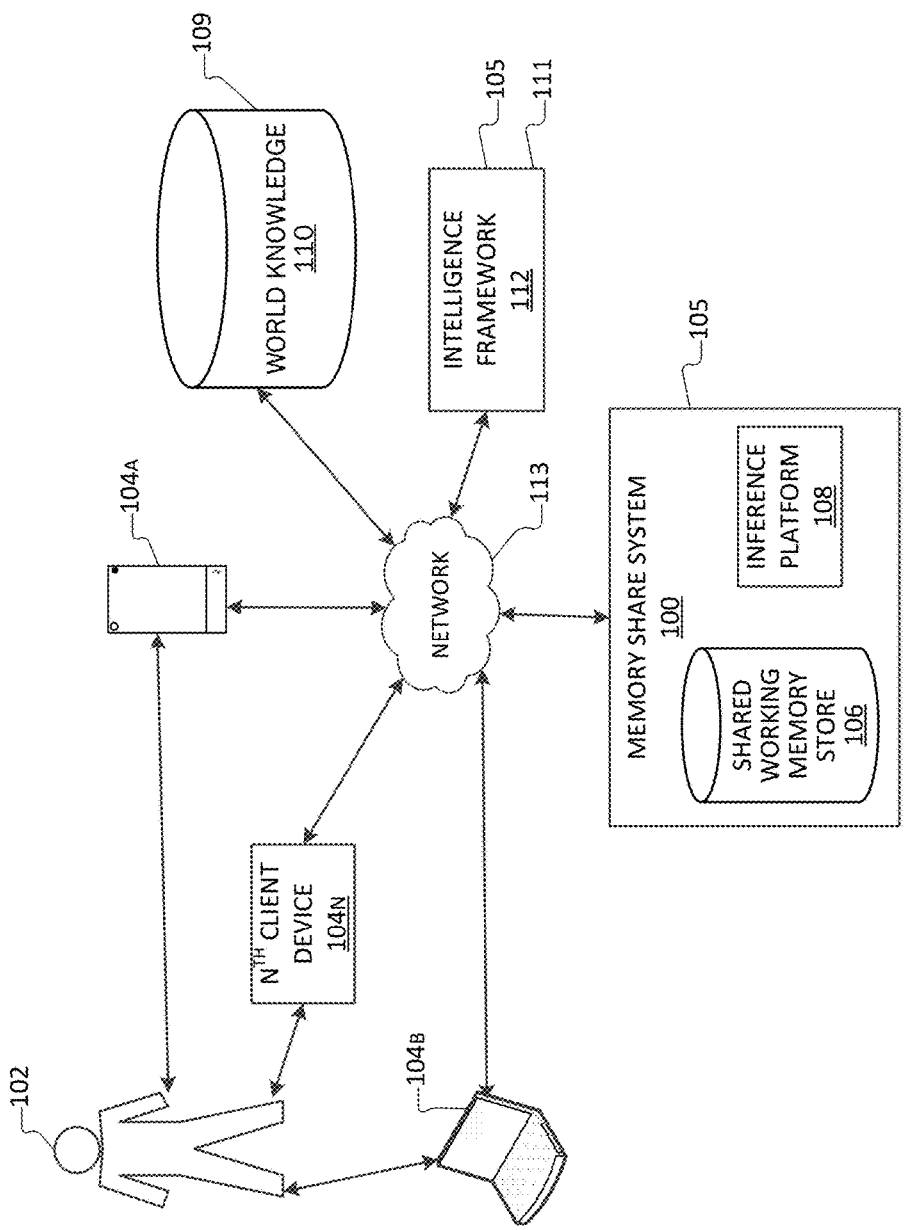
FIG. 1B is a schematic diagram illustrating a memory share system on a server computing device being utilized by a user via a client computing device, in accordance with aspects of the disclosure.

FIGS. 1A and 1B illustrate different examples of a memory share system 100 that intelligently suggests relevant topics and/or information based on what is contained in a shared working memory compiled from the temporary memories on a client computing device 104 being utilized by a user 102, in accordance with aspects of the disclosure. The temporary memories (or working memories) are temporary data stores located on the user various device.

In some aspects, the memory share system 100 is implemented on the client computing device 104 as illustrated in FIG. 1A. In a basic configuration, the client computing device 104 is a computer having both input elements and output elements. The client computing device 104 may be any suitable computing device for implementing the memory share system 100. For example, the client computing device 104 may be a mobile telephone, a smart phone 104A, a tablet, a phablet, a smart watch, a wearable computer, a personal computer, a gaming system, a desktop computer, a laptop computer 104B, and/or etc. The user may be associated with any number of client devices ($N^{th}$ client device 104N). This list is exemplary only and should not be considered as limiting. Any suitable client computing device 104 for implementing the memory share system 100 may be utilized.

In other aspects, the memory share system 100 is implemented on a server computing device 105, as illustrated in FIG. 1B. The server computing device 105 may provide data to and/or receive data from the client computing device 104 through a network 113. In some aspects, the network 113 is a distributed computing network, such as the internet. In further aspects, that memory share system 100 is implemented on more than one server computing device 105, such as a plurality or network of server computing devices 105. In some aspects, the memory share system 100 is a hybrid system with portions of the memory share system 100 on the client computing device 104 and with portions of the memory share system 100 on the server computing device 105.

The memory share system 100 collects data 116 from the temporary memory stores (or the working memories) on client computing devices 104 associated with the user 102 over the network 113. The term collect as utilized herein refers the active retrieval of items and/or to the passive receiving of items. The data may include GPS coordinates, photos, browser history, emails, text messages, social data, calendar items, professional data, events, and other user application data. As such, the memory share system 100 may collect data from different digital assistant applications running on different user devices. For example, the memory share system 100 may collect data from at least two different digital assistant applications running on at least two different user devices 104. In some aspects, the memory share system 100 may only be able to collect data 116 form the temporary memory stores of the user's client computing devices that are active and connected to a network 113. A client computing device 104 is inactive when turned off and active when turned on.

Further, the memory share system 100 collects world knowledge 110 and/or intelligence frameworks over the network 113. In some aspects, the world knowledge 110 and/or the intelligence framework is stored on database 109. In other embodiments, the intelligence framework 112 is stored on a server of an intelligence system 111.

The memory share system 100 includes a shared working memory 106. The memory share system 100 maintains the shared working memory 106 until the occurrence of a condition. The shared working memory store 106 of the memory share system 100 stores the collected data 116 from the working memories of the user devices 104 and any other collected information on the memory share system 100. The working memories of the client computing device 104 and the shared working memory store 106 of the memory share system 100 provide temporary data storage. Accordingly, the working memories and the shared working memory store 106 are deleted or wiped clean after an occurrence of a condition. In some aspects, the condition may be the same for each client computing device 104. In other aspects, the condition may vary between different client computing devices 104. Further, the condition for the shared working memory store 106 may be the same the condition utilized by the working memories of the one or more client computing devices 104. In alternative aspects, the condition for the shared working memory store 106 may be different from the condition utilized by any of the working memories of the one or more client computing devices 104.

The condition may be a set time period, such as one day, 2 days, 5 days, 1 week, 5 hours, 10 hours, 12 hours, etc. In alternative aspects, the condition is certain amount of data storage. In further aspects, the condition is a change in user context for a predetermined amount of time. In other aspects, the condition is a change in user digital activity, user physical activity, and/or user location. For example, the condition may be the occurrence of no user digital activity for a predetermined amount of time, such as 1 hour or 3 hours.

The shared working memory store 106 collects data 116 from the working memories of the user's client computing devices and collects additional information from the inference platform 108. For example, the additional information may include any determined elements, enriched elements, user context, and/or response. The memory share system 100 is able synchronize all of the working memories of the user's client computing device that are active and connected to the network utilizing the shared working memory 106. In some aspects, the memory share system 100 sends changes or updates made in the shared working memory store 106 to each working memory on the user device. The memory share system 100 may synchronize the working memories of the user's client computing devices 104 after a predetermined amount of time, in response to a change or update made to the shared working memory, or every time the user device communicates with the memory share system.

Figure 2:
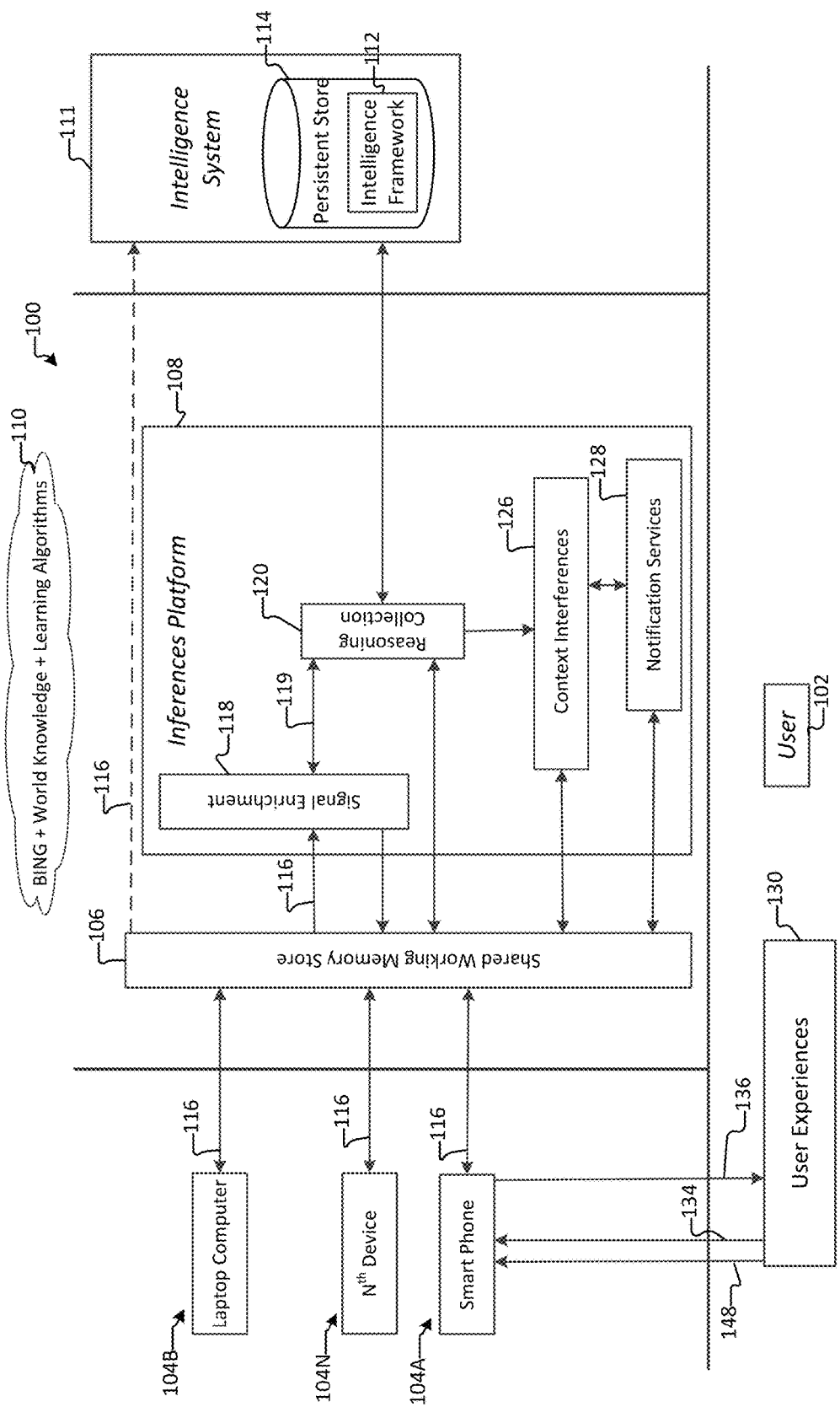
FIG. 2 is a simplified schematic block diagram illustrating the use of a memory share system by a user, in accordance with aspects of the disclosure.

The memory share system 100 also includes an inference platform 108. FIG. 2 is an example of a simplified schematic block diagram illustrating the inference platform of the memory share system 100, in accordance with aspects of the disclosure. The inference platform 108 of the memory share system 100 makes inferences utilizing world knowledge 110 and/or a collected intelligence framework based solely on data collected from the shared working memory 106. Further, any inference determined by the inference platform 108 is stored or saved on the shared working memory 106. As such, all of the information utilized by the inference platform 108 or determined by the inference platform is also deleted upon the occurrence of the condition.

The inference platform 108 of the memory share system 100 collects the data 116 gathered by the shared working memory store 106. The inference platform 108 includes a reasoning collection system 120, a context inference system 126, and a notification system 128. The inference platform 108 may also include an enrichment system 118.

The data 116 is produced by signal generators on the user devices 104. The signal generators may be applications running on the user's devices 104, such as a digital assistant application, a voice recognition application, an email application, a social networking application, a collaboration application, an enterprise management application, a messaging application, a word processing application, a spreadsheet application, a database application, a presentation application, a contacts application, a gaming application, an e-commerce application, photo application, mapping application, an e-business application, a transactional application, an exchange application, a device control application, a web interface application, a calendaring application, etc. The data 116 may also include user queries requested by a user 102 via the client computing device 104. The data 116 may also include user patterns and/or user feedback.

In some aspects, the inference platform 108 sends the data out to an intelligence system 111 for enrichment. In these aspects, the intelligence system 111 determines elements from the data and enriches the elements utilizing world knowledge 110 to form enriched elements 119. Further, in these aspects, the enriched elements 119 are collected from the intelligence system 111 by the reasoning collection system 120 of the inference platform 108.

The reasoning collection system 120 collects any needed information from the intelligence system 111 or world knowledge 110 over the network 113. For example, reasoning collection system 120 may collect one or more intelligence frameworks 112 from one or more intelligence systems 111. An intelligence framework 112 provides relationships or links between enriched elements. The intelligence system 111 one or more intelligence frameworks 112 based on received enriched elements. The enriched elements are not limited to the enriched elements stored shared working memory store 106. The one or more intelligence frameworks 112 may be created by the intelligence system 111 utilizing machine learning techniques and/or statistical modeling techniques. In some aspects, the machine learning techniques and/or statistical modeling techniques are collected from the world knowledge 110 by intelligence system 111. The intelligence system 111 stores the elements, enriched elements, and/or the created intelligence frameworks 112 on a persistent store 114. As such, the reasoning collection system 120 may collect the elements, enriched elements, and/or the created intelligence frameworks 112 from the persistent store 114 if the intelligence system 111.

In some aspects, the intelligence framework 112 is a user centric memory graph. The user centric memory graph is created by the intelligence system 111 by linking the enriched elements 119 based on relationships created in the space, the time, and the cognitive dimensions of the user. Once the user centric memory graph is created or formed, the intelligence system 111 stores the user centric memory graph on the persistent store 114.

In some aspects, the intelligence system 111 utilizes the determined enriched signals from shared working memory and the created intelligence framework 112 to determine a user context or the current state of the user 102. In other aspects, the intelligence system utilizes the determined enriched signals from shared working memory, the created intelligence framework 112, and other known user elements that are not limited by the temporary memory of memory share system 100 to determine a user context or the current state of the user 102. The current state or user context is based on the current location of the user, the current time, current weather, the current digital behavior of the user, and/or current user physical activity. In some aspects, the user context may include a requested user query. Each of these contextual elements may be determined by intelligence system 111 from determined enriched signals and the created one or more intelligence frameworks 112. Additionally, the intelligence system 111 may utilize machine learning techniques and/or statistical modeling techniques to determine the user context. Further, the intelligence framework 112 may link or associate determined user patterns with one or more specific user contexts to improve user context determinations. In some aspects, the user context is determined from recently formed enriched elements 119. In other aspects, the user context is determined only from data in the shared working memory store 106.

In alternative aspects, the inference platform 108 enriches the data utilizing the enrichment system 118. The enrichment system 118 of the inference platform 108 collects the data 116. The collected data 116 include elements and/or digital artifacts. The enrichment system 118 converts the digital artifacts into elements by analyzing the data in view of world knowledge 110. Additionally, the enrichment system 118 enriches the memory elements utilizing world knowledge 110 and/or one or more collected intelligence frameworks 112. World knowledge 110 as utilized herein includes any information that can be accessed utilizing a network connection, such as search engines and databases. For example, a digital artifact, such as GPS coordinates, has no memory value to the user 102. However, upon a search of the world knowledge 110, the enrichment system 118 can determine that these coordinates are for a Starbucks at a specific address in Seattle, Wash. In response to this determination, the enrichment system 118 may convert the digital GPS coordinates into an element of "Starbucks" and "Seattle." Further, the enrichment system 118 could search the world knowledge 110 to enrich the "Starbucks" memory element and determine that "Starbucks" is a coffee shop. In this embodiment, the enrichment system 118 may enrich the "Starbucks" memory element by tagging this memory element as a "coffee shop." As such, the enrichment system 118 tags elements and determines additional elements to form enriched elements 119. In some aspects, the memory elements include a user query. In these aspects, the enriched elements may include enriched user query elements.

In further alternative aspects, the inference platform 108 determines a user context. For example, the context inference system 126 of the inference platform 108 may determine the user context. The user context is determined by the inference platform 108 based on the enriched elements in the shared working memory store 106 and based on any collected intelligence frameworks 112, such as a user centric memory graph. As such, the user context is based on data retrieval across all of the user's devices 104 but is limited to the data contained on the working memories of the user devices. In these aspects, the context inference system 126 of the inference platform 108 collects enriched elements and/the one or more intelligence frameworks 112 from the reasoning collection system 120. Additionally, the intelligence system 111 for creating intelligence frameworks 112 may utilize machine learning techniques and/or statistical modeling techniques to determine the user context. Further, the intelligence framework 112 may link or associate determined user patterns with one or more specific user context to improve user context determinations. In some aspects, the user context is determined from recently formed enriched elements 119. In other aspects, the user context is determined based on any data stored in the shared working memory store 106.

Once the user context is determined, the reasoning collection system 120 sends the current user context to the shared working memory store 106 for storage. In some aspects, any user context stored on the shared working memory store 106 is deleted in response to the receipt of a new or updated user context. The context inference system 126 collects and/or determines the user context. The inference platform 108 and/or the intelligence system 111 monitor the recently received enriched elements 119 to determine if the user context needs to be updated or changed. For example, a user context may be updated in response to a change in location, a change in current weather, a change in time, a change in digital behavior, a requested user query, and/or a change in physical behavior.

Next, the context inference system 126 analyzes the intelligence framework based on the enriched elements and/or the user context to identify relevant elements on the intelligence framework.

In some aspects, the context inference system 126 compares a current user context and/or the enriched elements in the shared working memory store 106 to the intelligence framework 112 to determine any connections or nodes that match the current user context. In these aspects, the matched nodes and/or relationships are identified as the relevant elements. The context inference system 126 constrains the graph and/or system, such as a user centric memory graph or knowledge graph, based on the relevant elements (matched nodes and connections) to form a contextually constrained memory graph.

In further aspects, the context inference system 126 ranks all of the relevant elements. The context inference system 126 may utilize a ranking algorithm to rank the relevant elements based on the user context. In some aspects, the ranking algorithm is collected from the world knowledge 110. In further aspects, the ranking may be based on a received user query, user pattern, and/or user provided feedback and/or enriched elements in the user context. In some aspects, the context inference system 126 determines one or more responses based on the constrained memory graph and/or the ranked relevant elements.

In alternative aspects, any known learning algorithm is utilized by the context inference system 126 to determine a response 136 based on any collected intelligence frameworks 112, the user context, and the enriched elements in the shared working memory store 106. Alternatively, any known learning algorithm is utilized by the context inference system 126 to determine a response 136 based on any collected intelligence framework 112 and the enriched elements in the shared working memory store 106. In these embodiments, the user context is not collected and/or utilized by inference system 108. The learning algorithm may be collected from the world knowledge by the inference platform 108.

The response is any action, information, or topic that the context inference system 126 determines is relevant or may be desired by the user 102 given the user context. As discussed above, the user context includes received user requests and/or queries. Accordingly, the response may be an answer to the user query 134 or provide relevant information, recommendations, or topics. The response may be the performance of a memory related task or action based on a user query. The response may be an unrequested memory prompts (or push notification). An unrequested memory prompt provides information, topics, and/or recommendations to the user even though the information, topics, and/or recommendation was not requested by the user 102. A requested memory prompt provides information and/or a recommendation to the user 102 that was requested by the user 102. As discussed above, the unrequested memory prompt is any information and/or recommendations that the context inference system 126 determines is relevant or may be desired by the user 102 given the user context and/or the enriched elements stored in the shared working memory. For example, the response may include a prompt and/or recommendation to provide weather information, to provide coupon codes, to remind the user of a meeting, to create a calendar event, to send a text message, to set a reminder, to perform a query using a search engine (e.g., Bing, Google, Yahoo), to recommend related topics, to recommend related articles, to recommend related websites, and the like.

The notification system 128 collects the determined recommendations from the context inference system 126. The notification system 128 determines whether or not to send one or more responses to the user 102 given the current context. The notification system 128 compares each response to a relevancy threshold. If the notification system 128 determines that a response meets the relevancy threshold, the response is provided to the user 102. If the notification system 128 determines that a response does not meet the relevancy threshold, the response is not provided to the user 102. In some aspects, if a response is based on a user query, the notification system 128 may automatically determine that the response is relevant to the user. In other aspects, responses based on a user query 134 still have to meet the relevancy threshold before they are provided to the user. For example, the relevancy threshold may be a certain number of connections on the graph or may be rank above a mean rank score.

Once the notification system 128 has determined to provide the response 136 to the user 102, the response 136 is provided for delivery to user 102. The response may be provided to one or more the user's client computing devices 104 for delivery to the user 102. The client computing device 104 delivers the response to the user. In some aspects, the response 136 is automatically performed by the client computing device 104. In other aspects, the response 136 is sent from a server computing device 105 to one or more client computing devices 104 as instructions for performance by the client computing devices 104. In some aspects, the response is converted into phrases, words, and/or terms. The response 136 may be provided to the user 102 via any known output method, such as audio, visual, and tactile. For example, the response may be an unrequested prompt displayed by one or more of the user's client computing devices 104. In some aspects, every active client computing device 104 of the user that is connected to the network displays the response 136. In other embodiments, the response is displayed on user devices 104 that are active, connected to the network, and have recent digital activity by the user 102. The response 136 is collected by the shared working memory store 106 for temporary storage.

As discussed above, the memory share system 100 intelligently suggests relevant topics or information based on what is contained in a shared working memory compiled from the temporary memories on a client computing device 104 being utilized by a user 102. The ability of the memory share system 100 to intelligently suggest relevant topics or information based on the shared working memory of the user improves a user's ability to accomplish tasks, improves the recall of needed memory items, improves the usability, improves the performance, and/or improves user interactions of/with the users devices when compared to previously utilized systems or methods that do not intelligently suggest relevant topics or information based on a shared working memory of the user. Additionally, the ability of the memory share system 100 to provide responses to the user 102 according to the shared working memory and the user context allows the memory share system 100 to provide a user experience 130 that is more thoughtful and/or more relevant to the user when compared to previously memory share systems that are not capable of providing responses based on the shared working memory.

In some aspects, the memory share system 100 collects user feedback 148 to displayed responses 136. The feedback may be explicit or implicit from the user 102. Explicit feedback is when the user provides comments on a provided response. For example, the user 102 may select or input a request not to provide a given response ever again or may select or input that the user liked a provided response. In contrast, implicit feedback is the monitoring of user behavior in response to a provided response. For example, the selection/non-selection, the duration of use, and/or the pattern of use of provided responses may be monitored to determine user feedback 148. The user feedback 148 is collected by the shared working memory. The feedback 148 is processed by the inference platform 108. As such, the feedback 148 may be utilized to update the inference platform 108 to determine responses 136. Further, the feedback 148 may be utilized to update or train machine learning and statistical modeling techniques. In some aspects, the memory share system 100 does not collect any feedback 148 regarding a given response. In these instances, no elements relating to user feedback are collected by the shared working memory.

Figure 3A:
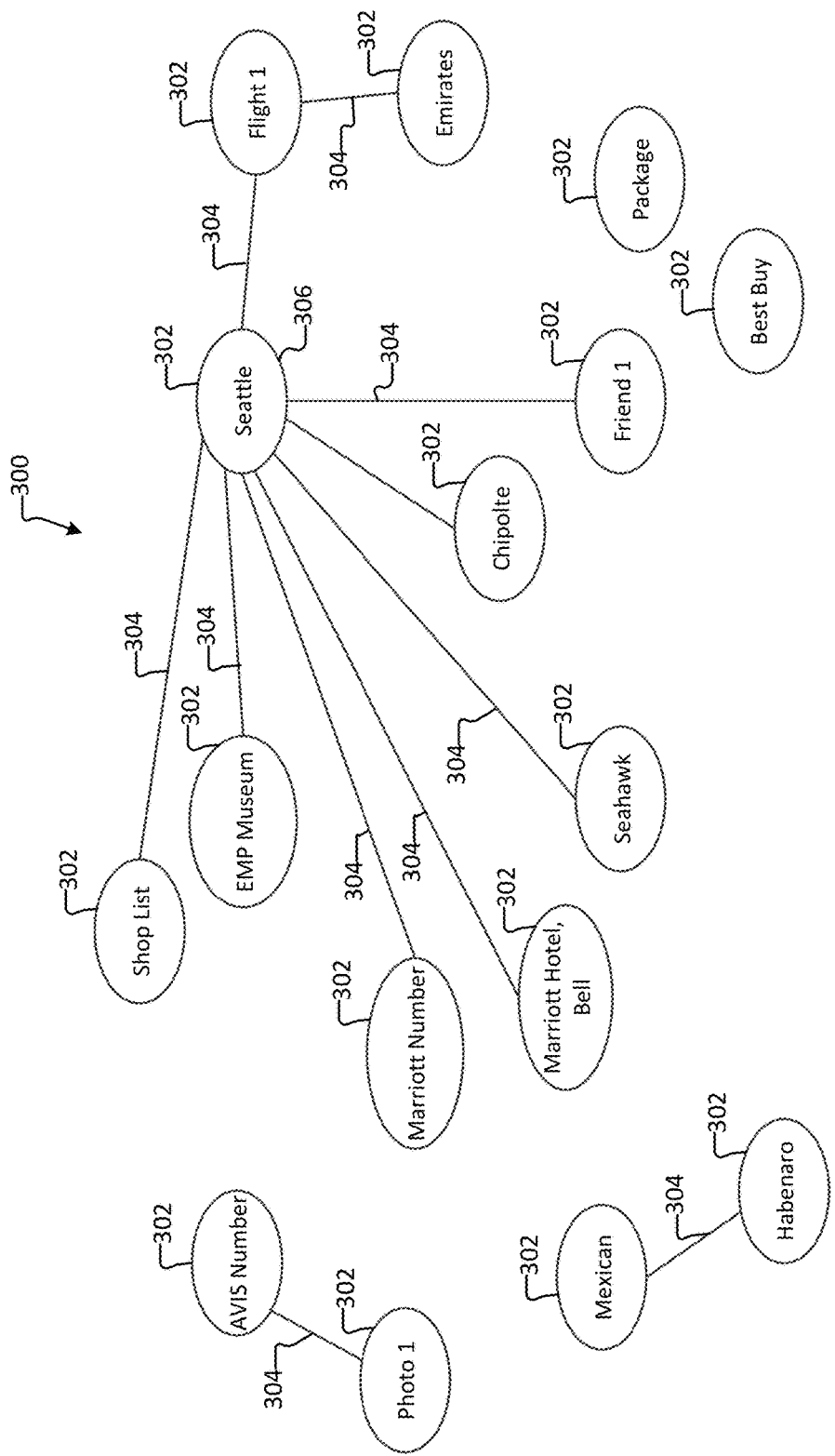
FIG. 3A is a simplified schematic diagram illustrating an intelligence framework, in accordance with aspects of the disclosure.

FIG. 3A is a simplified schematic diagram illustrating an example of an intelligence framework 300, in accordance with aspects of the disclosure. More specifically, the intelligence framework 300 illustrated in FIG. 3A is a user centric memory graph. This figure is exemplary only and any suitable intelligence framework for linking and illustrating relationships between enriched elements may be utilized by memory share system 100. The user centric memory graph 300 includes nodes 302 which are linked 304 to other nodes 302 based on relationships in time, space, and the cognitive dimensions. As discussed above, the nodes 302, links 304 and relationships are all user centric or related specifically to a given user. For example, the links 304 are based on spatial relationships of memory elements to the city of Seattle 306 for the user.

Figure 3B:
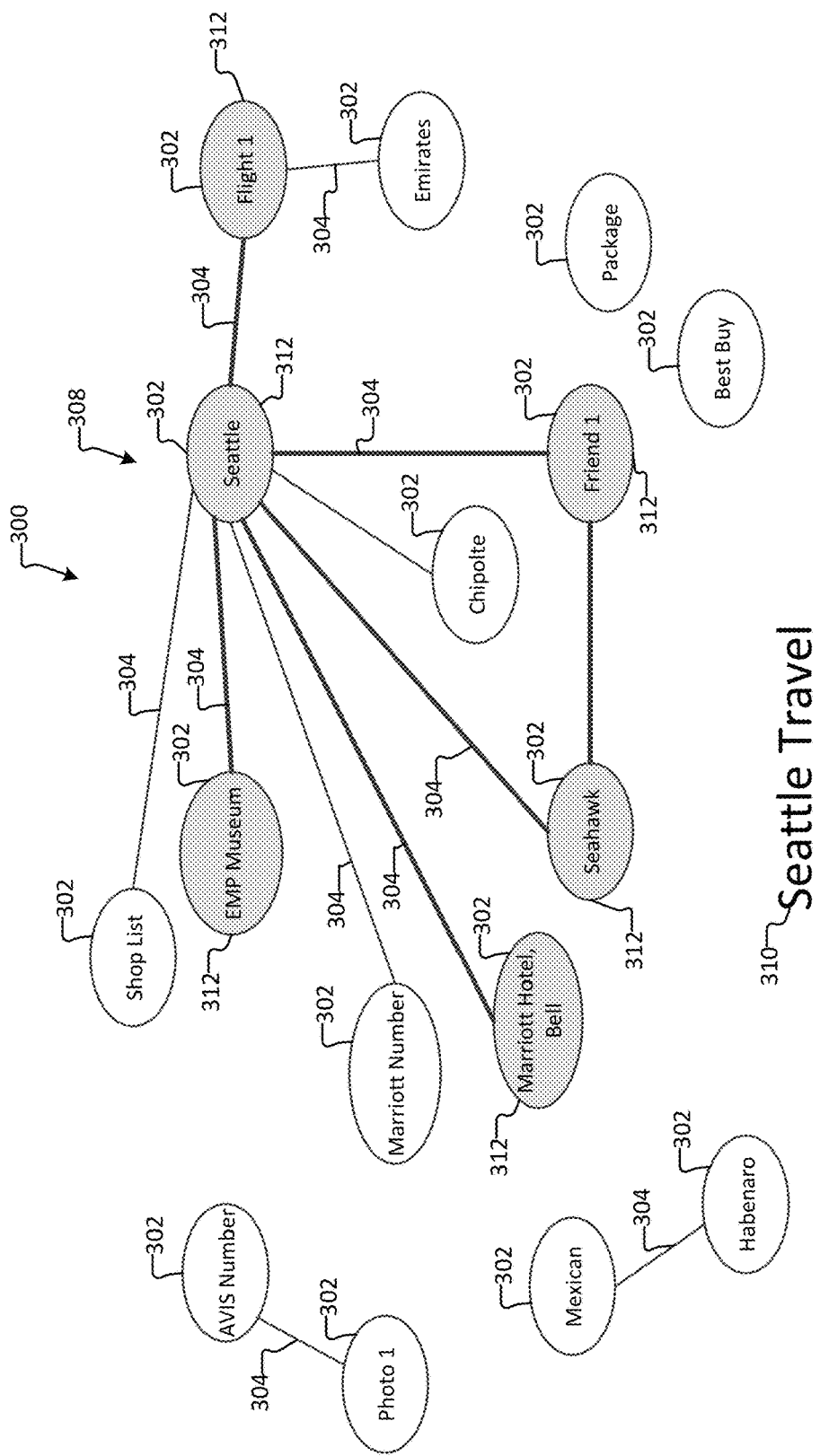
FIG. 3B is a simplified schematic diagram illustrating the intelligence framework of FIG. 3A constrained based on a user context and enriched elements, in accordance with aspects of the disclosure.

FIG. 3B is simplified schematic diagram illustrating the user centric memory graph 300 of FIG. 3A constrained 308 based on a user context 310 determined from elements gathered from the working memories of the user devices and enriched to form enriched elements, in accordance with aspects of the disclosure. For example, FIG. 3B illustrates a user context of "Seattle Travel" 310, enriched elements of EMP museum, Seahawks, and Marriot Hotel, Bell in the user's browser history of the user's lap top computer, and a recent call to friend 1 and uploading of boarding pass for flight 1 from the smart phone of the user. Based on this context 310 and the enriched elements, relevant memory elements 312 are identified from the user centric memory graph 300 as illustrated in FIG. 3A. These relevant memory elements 312 will be utilized to constrain the user centric memory graph 300 to form a constrained memory graph 308 (as illustrated by the grayed nodes and bolded links). In this example, the memory share system 100 will utilize the constrained memory graph 308 to determine whether or not to provide a response to the user given the user context of "Seattle Travel" 310.

Figure 4:
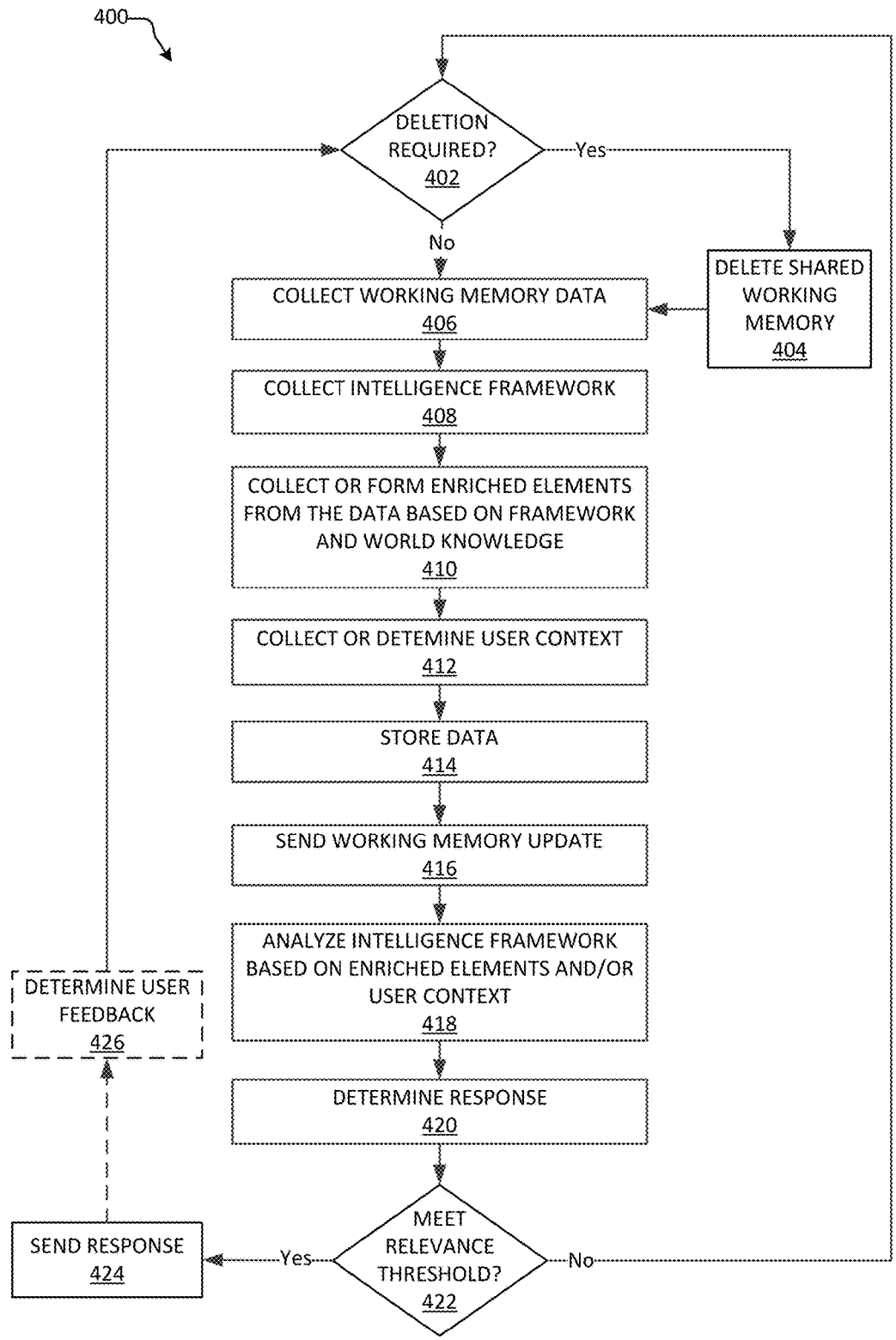
FIG. 4 is a block flow diagram illustrating a method for intelligent memory sharing and contextual retrieval across multiple devices and/or multiple applications of a user, in accordance with aspects of the disclosure.

FIG. 4 illustrates a flow diagram conceptually illustrating an example of a method 400 for intelligence memory sharing and/or contextual retrieval across multiple devices. In some aspects, method 400 is performed by the memory share system 100 as described above. Method 400 provides an application that improves a user's ability to accomplish tasks, improves the recall of needed memory items, improves the usability, improves the performance, and/or improves user interactions of/with the users devices when compared to previously utilized systems or methods that do not intelligently suggest relevant topics or information based on a shared working memory of the user. For example, method 400 may provide information to the user that user needs before the user even realizes or remembers that this information is needed, such as reward numbers, coupons, reminders, etc.

Method 400 includes decision operation 402. At decision operation 402, a determination as to whether to wipe the shared working memory is made. At decision operation 402, a determination as to whether a condition has occurred or not is made. If the condition has occurred, decision operation 402 determines that the shared working memory should be deleted and selects to perform deletion operation 404. If the condition has not occurred, decision operation 402 determines that the shared working memory should not be deleted and selects to perform collect operation 406. As discussed above, the condition may be a set time period, certain amount of data storage, a change in user context for a predetermined amount of time, a change in user digital activity, a change in user physical activity, and/or a changed user location.

Method 400 includes deletion operation 404. At deletion operation 404, the shared working memory is deleted or wiped clean. Upon deletion, the shared working memory will have no data stored in its memory. As such, the shared working memory is a temporary memory store that is not maintained or persisted past the occurrence of a condition. As such, the temporary memory of the shared working memory is maintained until the occurrence of the condition. The shared working memory is maintained by performing operations 406 through 426 based on the determination at operation 402 that the condition has not yet occurred. All inferences that are determine during the performance of method 400 utilizing world knowledge and/or a collected intelligence framework are based solely on data collected from the shared working memory. Further, any inference determined during the performance of method 400 is stored or saved on the shared working memory. As such, any collected data, information or intelligence framework and any determined inference is deleted upon the occurrence of the condition during method 400.

Method 400 includes collect operation 406. At collect operation 406, data from the working memories or the temporary memories of any device associated with the user is collected. The data may include elements or digital artifacts. In some aspects, collect operation 406 collects other information as well including any responses generated by method 400.

Method 400 includes framework operation 408. At framework operation 408, an intelligence framework from a persistent store is collected. In some aspects, the intelligence framework is created and stored by an intelligence system. As discussed above an intelligence system is for creating an intelligence framework.

Next, method 400 includes enrich operation 410. In some aspects, at enrich operation 410, memory elements are enriched with the world knowledge and/or the intelligence framework to form enriched elements. In further aspects, at enrich operation 410, digital artifacts in the data are converted into elements utilizing world knowledge. These elements may also be enriched at enrich operation 410 utilizing world knowledge to form the enriched elements. In alternative aspects at enrich operation 410, the data from the working memories of the user devices are sent to an intelligence system and any formed enriched elements created from this sent data by intelligence system is collected at enrich operation 410.

In some aspects, at enrich operation 410 the enriched elements are analyzed to determine user patterns and/or user feedback. In some aspects, enrich operation 410 updates or trains the machine learning techniques and/or statistical modeling techniques based on the determined user feedback and/or user patterns. In additional aspects, the user feedback and/or the user patterns are added to the enriched elements.

Next, context operation 412 is performed. In some aspects at context operation 412, a current user context or the current state of the user is determined based on the determined enriched elements and/or the collected enriched elements. In alternative aspects, at context operation 412, the current user context is collected from intelligence system. The user context is consistently changing and/or being updated as time passes, the environment changes, user location changes, and/or as user behavior/activity change. As discussed above, the current state of the user or the current user context is based on the current location of the user, the current time, current weather, the current digital behavior of the user, and/or current user physical activity. In some aspects, the user context may include a requested user query. As the enriched elements change so too may the current user context from a first user context to a second user context, from a second user context to a third user context, etc. In some aspects, context operation 412 utilizes machine learning techniques and/or statistical modeling techniques to determine the user context from the enriched elements. Further, determined user patterns and user feedback may be linked or associated with one or more specific user contexts to improve user context determinations.

Method 400 also includes a store operation 414. At store operation 414 any determined or collected information is added to the shared working memory for temporary storage. For example, any determined or collected elements, digital artifacts, enriched elements, user context, user feedback, and/or user pattern is stored on the shared working memory.

A synchronize operation 416 is also performed during method 400. At synchronize operation 416 the information stored on the shared working memory is synchronized with the working memories on each of the user's device. In some aspects, synchronize operation 416 is performed every time the shared working memory changes or is updated. In other aspects, synchronize operation 416 is performed after a set amount of time which is less than a predetermined amount of time for decision operation 402. In other aspects, synchronize operation 416 is performed every time data is collected from a user device. In some aspects, only the changes or updates to the shared working memory are sent to the working memories of the client devices to synchronize the shared working memory with working memories on the user devices. In further aspects, the updates or changes sent to the working memories of the user devices at synchronize operation 416 may be unrequested updates or notifications.

Method 400 also includes an analyze operation 418. At analyze operation 418, the intelligence framework is analyzed in view of enriched elements and/or the user context. In some aspects at analyze operation 418, the intelligence framework is constrained based on the user context and/or the enriched elements to form a constrained intelligence framework. In some aspects, the user context includes a user query. In these aspects, the user centric memory graph is constrained based on the user query, the enriched elements, and/or the user context to form a user query constrained intelligence framework at analyze operation 418. In these aspects, the intelligence framework is constrained by comparing the user context and/or the enriched elements to the intelligence framework. Next, any elements of the user context and/or enriched elements that match elements on the intelligence framework that match based on the comparison are identified as relevant elements at analyze operation 418. In these aspects, the contextual constrained intelligence framework is formed based on the relevant elements at analyze operation 418. In other words, any elements on the user intelligence framework that were not identified as relevant elements are removed from the intelligence framework to form the contextually constrained intelligence framework at analyze operation 418.

In some aspects at analyze operation 418, the intelligence framework is analyzed in view of enriched elements and/or the user context to identify relevant elements utilizing a learning algorithm. In alternative aspects, the intelligence framework is analyzed in view of enriched elements and/or the user context utilizing machine learning and/or statistical modeling techniques to identify relevant elements at analyze operation 418. In some aspects, the machine learning and/or statistical modeling techniques or the learning algorithm are retrieved from world knowledge. In other aspects, the intelligence framework is a user centric memory graph.

In further aspects, at analyze operation 418 the relevant elements may be ranked based on the user context and/or the enriched elements to form ranked elements. In some aspects, the user context includes a user query enriched elements, a user pattern, and/or user feedback. In these embodiments, the ranking performed at analyze operation 418 may be based one or more of the user query enriched elements, the user pattern, and/or the user feedback of the user context. In some aspects, analyze operation 418 utilizes a ranking algorithm to rank the relevant elements based on the current context and/or the enriched elements.

While operations 402, 404, 406, 408, 410, 412, 414, and/or 416 are shown in a specific order within method 400, one or more of these operations may be performed continuously, upon conditions, and/or after a predetermined amount of time during the operation of method 400. As such, new or updated user contexts, user patterns, user feedback, and/or enriched elements may be produced in response each newly received piece of data during method 400. Further, new or updated user contexts, user patterns, user feedback, and/or enriched elements will have to be determined, formed, collected, and/or created in response to a deletion of the shared working memory.

After analyze operation 418, response operation 420 is performed. At response operation 420 one or more responses based on the analysis of the intelligence framework and/or the world knowledge is determined. In some aspects, the response is determined utilizing a learning algorithm. In further aspects, one or more of the responses are an unrequested memory prompt (or push notification). An unrequested memory prompt is contextually relevant information, topics, and/or recommendations provided to the user without user request. In other aspects, the one or more responses are answers to a received user query.

Next, relevance operation 422 is performed. At relevance operation 422 the relevancy of the one or more determined responses is determined. Each determined response is compared to a relevancy threshold at relevance operation 422. If relevance operation 422 determines that a response meets the relevancy threshold based on the comparison, relevance operation 422 selects to perform send operation 424. If relevance operation 422 determines that a response does not meet the relevancy threshold based on the comparison, relevance operation 422 selects to perform decision operation 402 again.

At send operation 424 the determined response that meets the relevancy threshold is provided to a user. As discussed above, the response may be provided to one or more client computing devices for delivery to the user. In some aspects, the response is automatically performed by a client computing device upon determination. In other aspects, the response is sent from a server computing device to one or more client computing devices 104 as instructions for performance by the client computing devices. In some aspects, the response is converted into phrases, words, and/or terms. In further aspects, the response provided to the user is sent to collect operation 406 as additional information for collection. In some aspects, the response is provided by displaying the response.

In some aspects, method 400 includes feedback operation 426. At feedback operation 426, user feedback is monitored or determined for the provided response. As discussed above, the user feedback may be implicit or explicit. Any determined user feedback is provided to collect operation 406 as an additional data at feedback operation 426.

FIGS. 5-8 and the associated descriptions provide a discussion of a variety of operating environments in which aspects of the disclosure may be practiced. However, the devices and systems illustrated and discussed with respect to FIGS. 5-8 are for purposes of example and illustration and are not limiting of a vast number of computing device configurations that may be utilized for practicing aspects of the disclosure, described herein.

Figure 5:
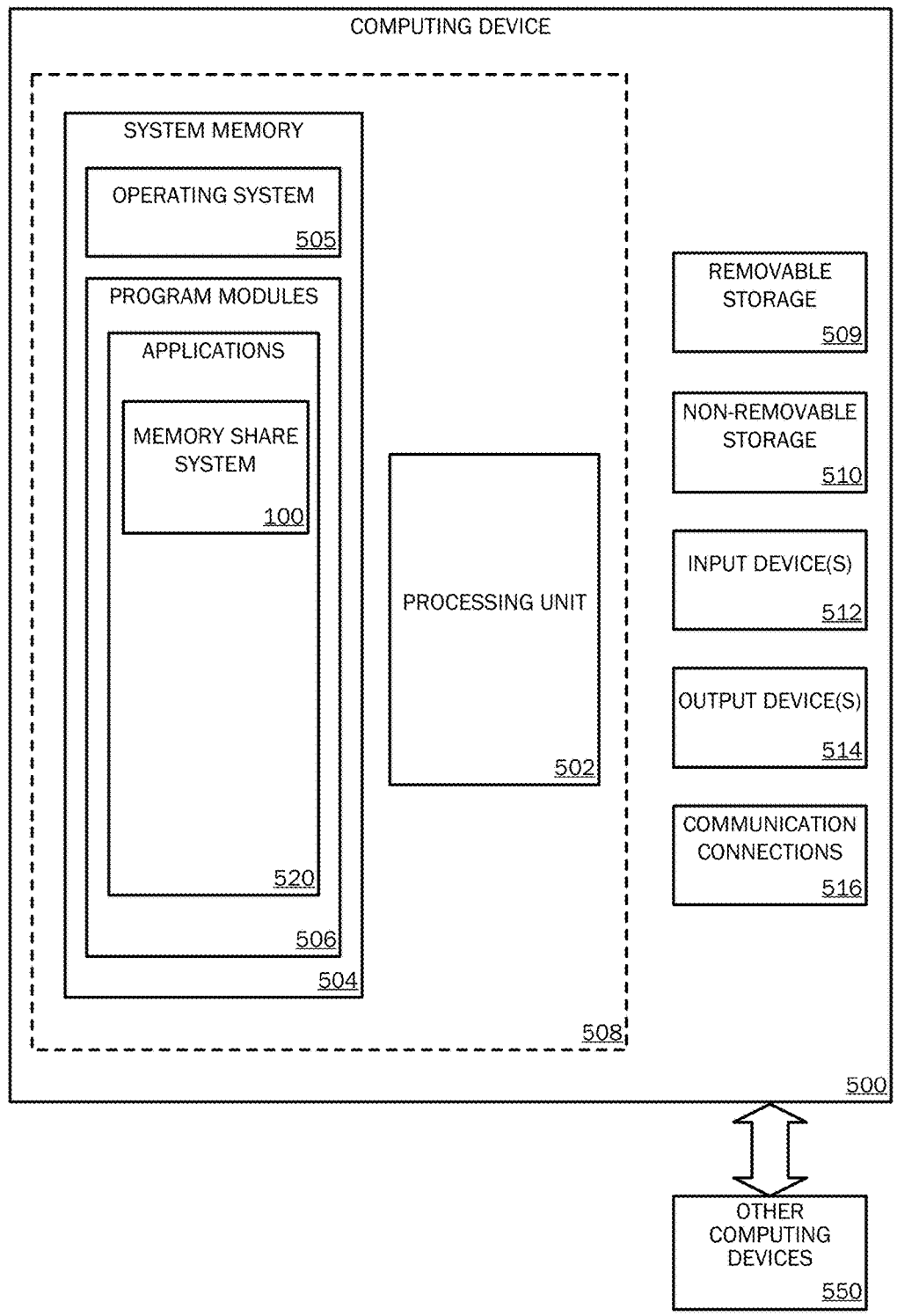
FIG. 5 is a block diagram illustrating example physical components of a computing device with which various aspects of the disclosure may be practiced.

FIG. 5 is a block diagram illustrating physical components (e.g., hardware) of a computing device 500 with which aspects of the disclosure may be practiced. For example, the memory share system 100 could be implemented by the computing device 500. In some aspects, the computing device 500 is a mobile telephone, a smart phone, a tablet, a phablet, a smart watch, a wearable computer, a personal computer, a desktop computer, a gaming system, a laptop computer, and/or etc. The computing device components described below may include computer executable instructions for the memory share system 100 that can be executed to employ method 400 to provide intelligence memory sharing and contextual retrieval across multiple devices.

Figure 7:
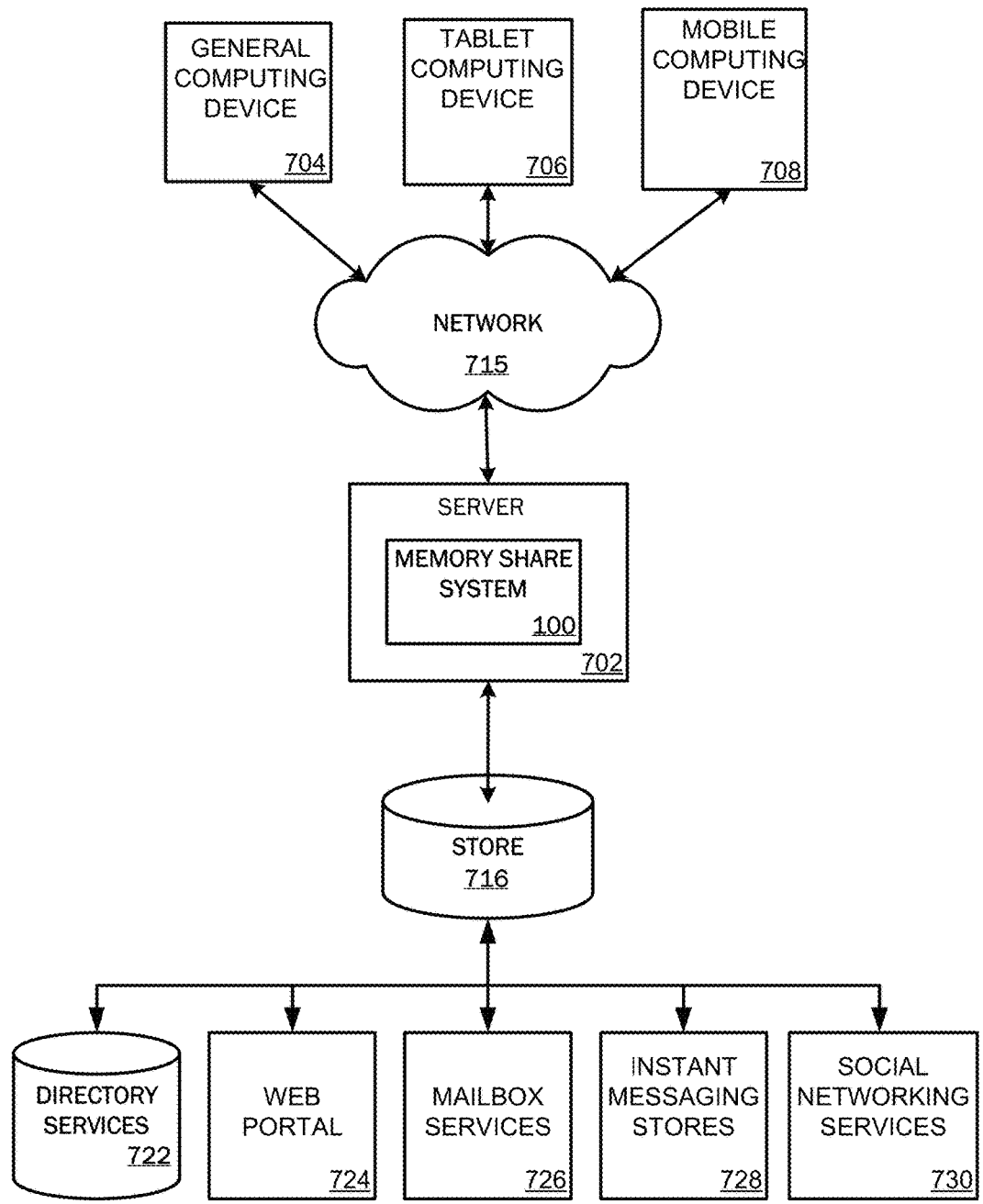
FIG. 7 is a simplified block diagram of a distributed computing system in which various aspects of the disclosure may be practiced.

In a basic configuration, the computing device 500 may include at least one processing unit 502 and a system memory 504. Depending on the configuration and type of computing device, the system memory 504 may comprise, but is not limited to, volatile storage (e.g., random access memory), non-volatile storage (e.g., read-only memory), flash memory, or any combined of such memories. The system memory 504 may include an operating system 505 and one or more program modules 506 suitable for running software applications 520. The operating system 505, for example, may be suitable for controlling the operation of the computing device 500. Furthermore, aspects of the disclosure may be practiced in conjunction with a graphics library, other operating systems, or any other application program and is not limited to any particular application or system. This basic configuration is illustrated in FIG. 7 by those components within a dashed line 508. The computing device 500 may have additional features or functionality. For example, the computing device 500 may also include additional data storage devices (removable and/or non-removable) such as, for example, magnetic disks, optical disks, or tape. Such additional storage is illustrated in FIG. 5 by a removable storage device 509 and a non-removable storage device 510.

As stated above, a number of program modules and data files may be stored in the system memory 504. While executing on the processing unit 502, the program modules 506 (e.g., the memory share system 100) may perform processes including, but not limited to, performing method 400 as described herein. For example, the processing unit 502 may implement the memory share system 100. Other program modules that may be used in accordance with aspects of the present disclosure, and in particular to generate screen content, may include a digital assistant application, a voice recognition application, an email application, a social networking application, a collaboration application, an enterprise management application, a messaging application, a word processing application, a spreadsheet application, a database application, a presentation application, a contacts application, a gaming application, an e-commerce application, an e-business application, a transactional application, exchange application, a device control application, a web interface application, a calendaring application, etc.

Furthermore, aspects of the disclosure may be practiced in an electrical circuit comprising discrete electronic elements, packaged or integrated electronic chips containing logic gates, a circuit utilizing a microprocessor, or on a single chip containing electronic elements or microprocessors. For example, aspects of the disclosure may be practiced via a system-on-a-chip (SOC) where each or many of the components illustrated in FIG. 5 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, with respect to the capability of client to switch protocols may be operated via application-specific logic integrated with other components of the computing device 500 on the single integrated circuit (chip).

Aspects of the disclosure may also be practiced using other technologies capable of performing logical operations such as, for example, AND, OR, and NOT, including but not limited to mechanical, optical, fluidic, and quantum technologies. In addition, aspects of the disclosure may be practiced within a general purpose computer or in any other circuits or systems.

The computing device 500 may also have one or more input device(s) 512 such as a keyboard, a mouse, a pen, a microphone or other sound or voice input device, a touch or swipe input device, etc. The output device(s) 514 such as a display, speakers, a printer, etc. may also be included. The aforementioned devices are examples and others may be used. The computing device 500 may include one or more communication connections 516 allowing communications with other computing devices 550. Examples of suitable communication connections 516 include, but are not limited to, RF transmitter, receiver, and/or transceiver circuitry, universal serial bus (USB), parallel, and/or serial ports.

The term computer readable media or storage media as used herein may include computer storage media. Computer storage media may include volatile and nonvolatile, removable and non-removable media implemented in any method or technology for storage of information, such as computer readable instructions, data structures, or program modules. The system memory 504, the removable storage device 509, and the non-removable storage device 510 are all computer storage media examples (e.g., memory storage). Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 500. Any such computer storage media may be part of the computing device 500. Computer storage media does not include a carrier wave or other propagated or modulated data signal.

Communication media may be embodied by computer readable instructions, data structures, program modules, or other data in a modulated data signal, such as a carrier wave or other transport mechanism, and includes any information delivery media. The term "modulated data signal" may describe a signal that has one or more characteristics set or changed in such a manner as to encode information in the signal. By way of example, and not limitation, communication media may include wired media such as a wired network or direct-wired connection, and wireless media such as acoustic, radio frequency (RF), infrared, and other wireless media.

Figure 6A:
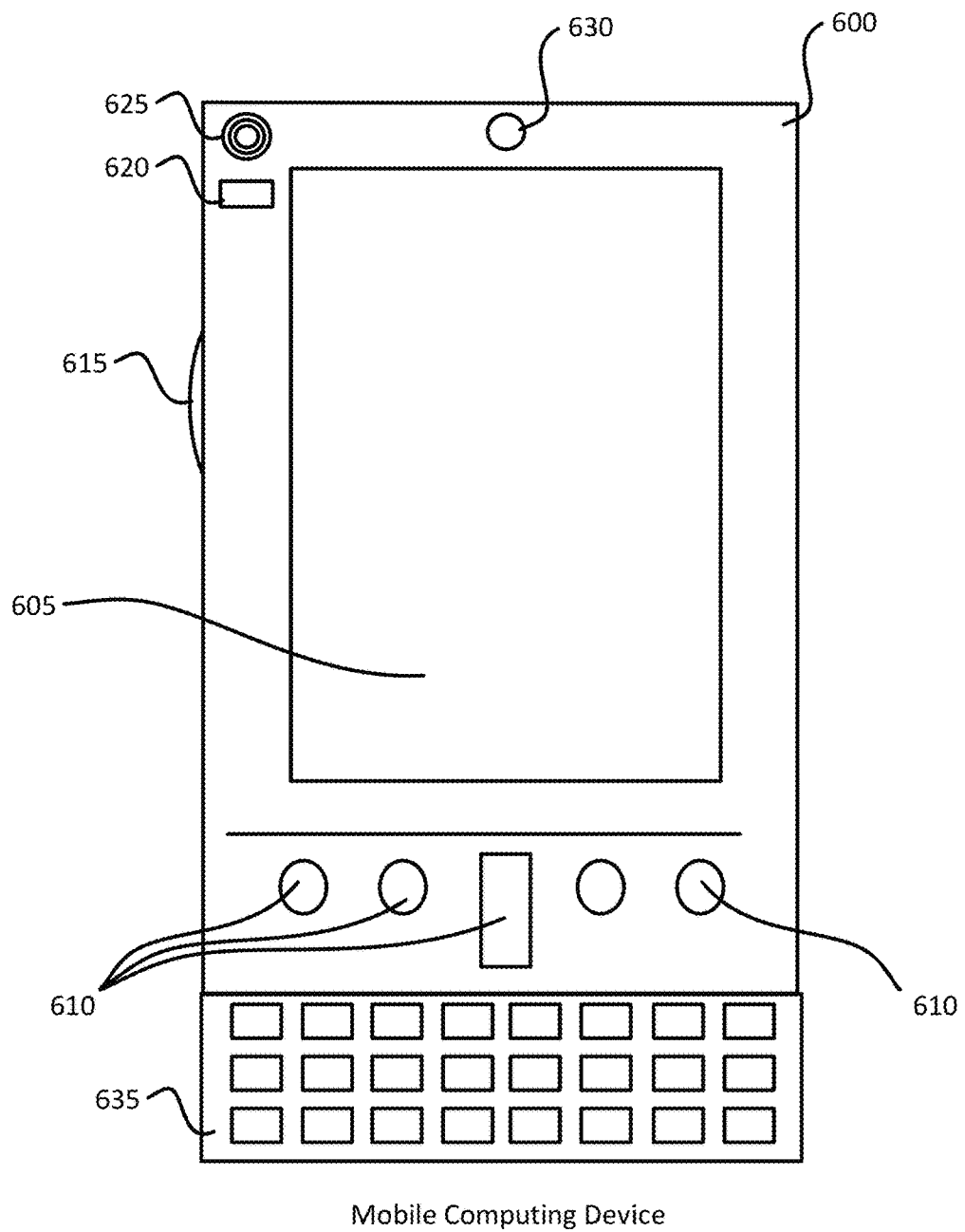
FIG. 6A is a simplified block diagram of a mobile computing device with which various aspects of the disclosure may be practiced.
Figure 6B:
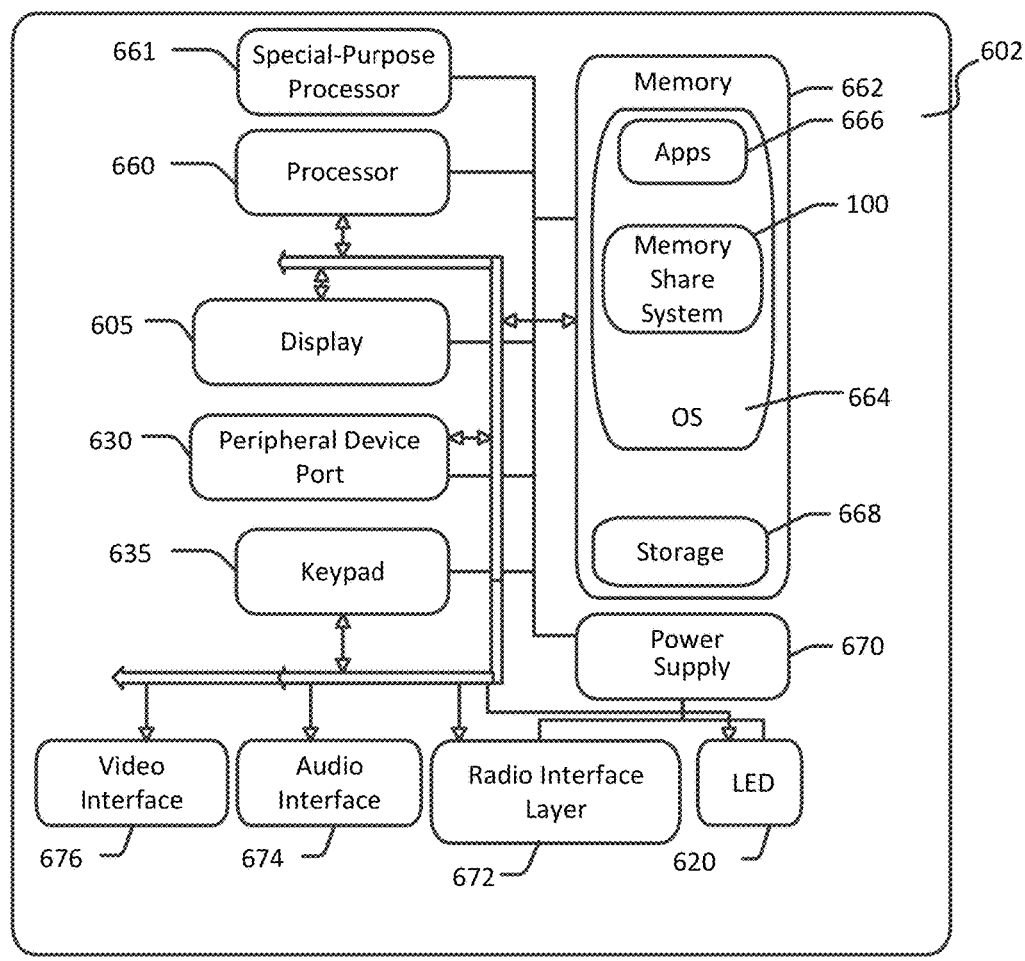
FIG. 6B is a simplified block diagram of the mobile computing device shown in FIG. 6A with which various aspects of the disclosure may be practiced.

FIGS. 6A and 6B illustrate a mobile computing device 600, for example, a mobile telephone, a smart phone, a tablet, a phablet, a smart watch, a wearable computer, a personal computer, a desktop computer, a gaming system, a laptop computer, or the like, with which aspects of the disclosure may be practiced. With reference to FIG. 6A, one aspect of a mobile computing device 600 suitable for implementing the aspects is illustrated. In a basic configuration, the mobile computing device 600 is a handheld computer having both input elements and output elements. The mobile computing device 600 typically includes a display 605 and one or more input buttons 610 that allow the user to enter information into the mobile computing device 600. The display 605 of the mobile computing device 600 may also function as an input device (e.g., a touch screen display).

If included, an optional side input element 615 allows further user input. The side input element 615 may be a rotary switch, a button, or any other type of manual input element. In alternative aspects, mobile computing device 600 may incorporate more or less input elements. For example, the display 605 may not be a touch screen in some aspects. In yet another alternative aspect, the mobile computing device 600 is a portable phone system, such as a cellular phone. The mobile computing device 600 may also include an optional keypad 635. Optional keypad 635 may be a physical keypad or a "soft" keypad generated on the touch screen display.

In addition to, or in place of a touch screen input device associated with the display 605 and/or the keypad 635, a Natural User Interface (NUI) may be incorporated in the mobile computing device 600. As used herein, a NUI includes as any interface technology that enables a user to interact with a device in a "natural" manner, free from artificial constraints imposed by input devices such as mice, keyboards, remote controls, and the like. Examples of NUI methods include those relying on speech recognition, touch and stylus recognition, gesture recognition both on screen and adjacent to the screen, air gestures, head and eye tracking, voice and speech, vision, touch, gestures, and machine intelligence.

In various aspects, the output elements include the display 605 for showing a graphical user interface (GUI). In aspects disclosed herein, the various user information collections could be displayed on the display 605. Further output elements may include a visual indicator 620 (e.g., a light emitting diode), and/or an audio transducer 625 (e.g., a speaker). In some aspects, the mobile computing device 600 incorporates a vibration transducer for providing the user with tactile feedback. In yet another aspect, the mobile computing device 600 incorporates input and/or output ports, such as an audio input (e.g., a microphone jack), an audio output (e.g., a headphone jack), and a video output (e.g., a HDMI port) for sending signals to or receiving signals from an external device.

FIG. 6B is a block diagram illustrating the architecture of one aspect of a mobile computing device. That is, the mobile computing device 600 can incorporate a system (e.g., an architecture) 602 to implement some aspects. In one aspect, the system 602 is implemented as a "smart phone" capable of running one or more applications (e.g., browser, e-mail, calendaring, contact managers, messaging clients, games, and media clients/players). In some aspects, the system 602 is integrated as a computing device, such as an integrated personal digital assistant (PDA) and wireless phone.

One or more application programs 666, the memory share system 100 runs on or in association with the operating system 664. Examples of the application programs include phone dialer programs, e-mail programs, personal information management (PIM) programs, word processing programs, spreadsheet programs, Internet browser programs, messaging programs, and so forth. The system 602 also includes a non-volatile storage area 668 within the memory 662. The non-volatile storage area 668 may be used to store persistent information that should not be lost if the system 602 is powered down. The application programs 666 may use and store information in the non-volatile storage area 668, such as e-mail or other messages used by an e-mail application, and the like. A synchronization application (not shown) also resides on the system 602 and is programmed to interact with a corresponding synchronization application resident on a host computer to keep the information stored in the non-volatile storage area 668 synchronized with corresponding information stored at the host computer. As should be appreciated, other applications may be loaded into the memory 662 and run on the mobile computing device 600.

The system 602 has a power supply 670, which may be implemented as one or more batteries. The power supply 670 might further include an external power source, such as an AC adapter or a powered docking cradle that supplements or recharges the batteries.

The system 602 may also include a radio 672 that performs the function of transmitting and receiving radio frequency communications. The radio 672 facilitates wireless connectivity between the system 602 and the "outside world," via a communications carrier or service provider. Transmissions to and from the radio 672 are conducted under control of the operating system 664. In other words, communications received by the radio 672 may be disseminated to the application programs 666 via the operating system 664, and vice versa.

The visual indicator 620 may be used to provide visual notifications, and/or an audio interface 674 may be used for producing audible notifications via the audio transducer 625. In the illustrated aspect, the visual indicator 620 is a light emitting diode (LED) and the audio transducer 625 is a speaker. These devices may be directly coupled to the power supply 670 so that when activated, they remain on for a duration dictated by the notification mechanism even though the processor 660 and other components might shut down for conserving battery power. The LED may be programmed to remain on indefinitely until the user takes action to indicate the powered-on status of the device. The audio interface 674 is used to provide audible signals to and receive audible signals from the user. For example, in addition to being coupled to the audio transducer 625, the audio interface 674 may also be coupled to a microphone to receive audible input. The system 602 may further include a video interface 676 that enables an operation of an on-board camera 630 to record still images, video stream, and the like.

A mobile computing device 600 implementing the system 602 may have additional features or functionality. For example, the mobile computing device 600 may also include additional data storage devices (removable and/or non-removable) such as, magnetic disks, optical disks, or tape. Such additional storage is illustrated in FIG. 6B by the non-volatile storage area 668.

Data/information generated or captured by the mobile computing device 600 and stored via the system 602 may be stored locally on the mobile computing device 600, as described above, or the data may be stored on any number of storage media that may be accessed by the device via the radio 672 or via a wired connection between the mobile computing device 600 and a separate computing device associated with the mobile computing device 600, for example, a server computer in a distributed computing network, such as the Internet. As should be appreciated such data/information may be accessed via the mobile computing device 600 via the radio 672 or via a distributed computing network. Similarly, such data/information may be readily transferred between computing devices for storage and use according to well-known data/information transfer and storage means, including electronic mail and collaborative data/information sharing systems.

FIG. 7 illustrates one aspect of the architecture of a system for processing data received at a computing system from a remote source, such as a general computing device 704, tablet 706, or mobile device 708, as described above. Content displayed and/or utilized at server device 702 may be stored in different communication channels or other storage types. For example, various documents may be stored using a directory service 722, a web portal 724, a mailbox service 726, an instant messaging store 728, and/or a social networking site 730. By way of example, the memory share system 100 may be implemented in a general computing device 704, a tablet computing device 706 and/or a mobile computing device 708 (e.g., a smart phone). In some aspects, the server 702 is configured to implement a memory share system 100, via the network 715 as illustrated in FIG. 7.

Figure 8:
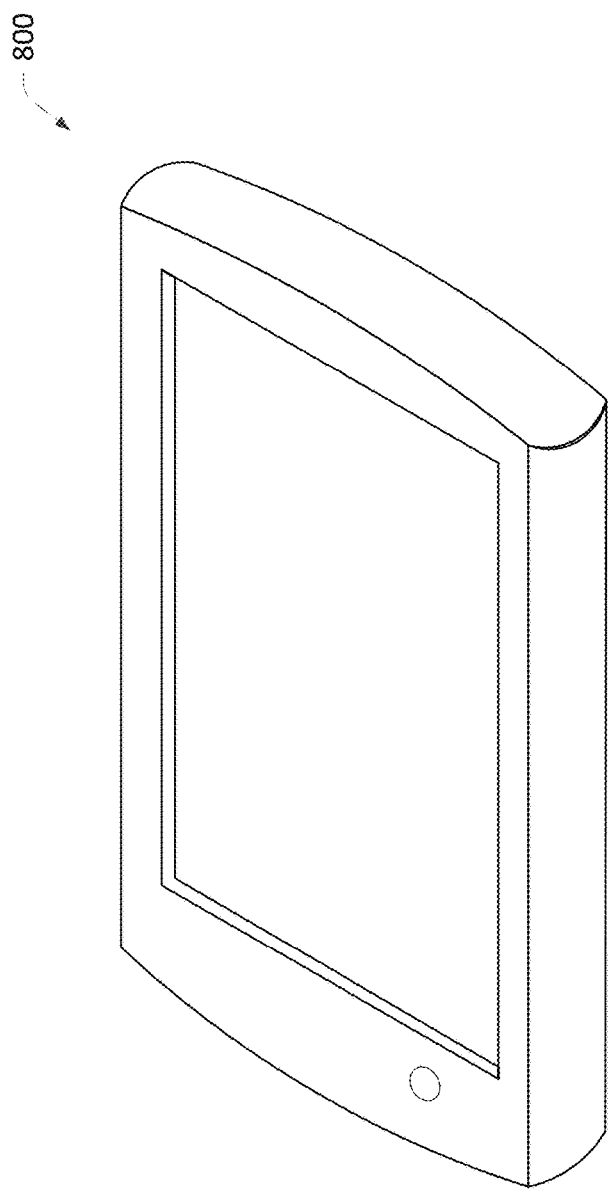
FIG. 8 illustrates a tablet computing device with which various aspects of the disclosure may be practiced

FIG. 8 illustrates an exemplary tablet computing device 800 that may execute one or more aspects disclosed herein. In addition, the aspects and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which aspects of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Embodiments of the present disclosure, for example, are described above with reference to block diagrams and/or operational illustrations of methods, systems, and computer program products according to aspects of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

This disclosure described some embodiments of the present technology with reference to the accompanying drawings, in which only some of the possible aspects were described. Other aspects can, however, be embodied in many different forms and the specific aspects disclosed herein should not be construed as limited to the various aspects of the disclosure set forth herein. Rather, these exemplary aspects were provided so that this disclosure was thorough and complete and fully conveyed the scope of the other possible aspects to those skilled in the art. For example, aspects of the various aspects disclosed herein may be modified and/or combined without departing from the scope of this disclosure.

Although specific aspects were described herein, the scope of the technology is not limited to those specific aspects. One skilled in the art will recognize other aspects or improvements that are within the scope and spirit of the present technology. Therefore, the specific structure, acts, or media are disclosed only as illustrative aspects. The scope of the technology is defined by the following claims and any equivalents therein.

The invention claimed is:

1. A system for intelligent memory sharing and contextual retrieval across multiple devices and multiple applications of a user, the system comprising:
   at least one processor; and
   a memory for storing and encoding computer executable instructions that, when executed by the at least one processor is operative to:
      maintain a shared working memory of the user for temporary storage of information until an occurrence of a condition;
      collect data from working memories of any device associated with the user;
      store the data on the shared working memory;
      collect an intelligence framework;
      store the intelligence framework on the shared working memory;
      analyze the data to determine elements listed within the data utilizing world knowledge, wherein world knowledge is other information discovered and accessed through a network connection, and wherein the world knowledge is associated with and enriches the data;
determine a user context based on the elements;
store the user context in the shared working memory;
send an update to all active devices of the of the user regarding changes to the shared working memory;
analyze the intelligence framework based on the user context;
determine a response based the analysis of the intelligence framework and the world knowledge;
compare the response to a relevancy threshold;
determine that the response meets the relevancy threshold;
send the response to all the active devices of the user and store the response in the shared working memory, upon making the determination that the response meets the relevancy threshold;
determine that the condition occurred; and
in response to the occurrence of the condition, delete all information stored on the shared working memory.

2. The system of claim 1, wherein the condition is meeting a predetermined amount of data storage.

3. The system of claim 1, wherein the condition is a change in at least one of a user digital activity, user physical activity, and user location.

4. The system of claim 1, wherein the condition is a time period of one day.

5. The system of claim 1, wherein the user context is a current user location, current time, and current user digital behavior.

6. The system of claim 1, wherein the intelligence framework is analyzed utilizing machine learning and statistical modeling techniques.

7. The system of claim 1, wherein determine the user context is further based on the intelligence framework.

8. The system of claim 1, wherein the multiple applications include at least one of:
a digital assistant application;
a voice recognition application;
an email application;
a social networking application;
a collaboration application;
an enterprise management application;
a messaging application;
a word processing application;
a spreadsheet application;
a database application;
a presentation application;
a contacts application;
a gaming application;
an e-commerce application;
an e-business application;
a transactional application;
a device control application;
a web interface application;
an exchange application; or
a calendaring application.

9. The system of claim 1, wherein the update is an unrequested update.

10. The system of claim 1, wherein the user context includes a user query.

11. The system of claim 1, wherein analyze the intelligence framework based on the user context comprises:
identifying relevant elements on the intelligence framework based on the user context; and
ranking the relevant elements based on the user context to form ranked elements, wherein determining the response is also based on the ranked elements.

12. A system for intelligent memory sharing and contextual retrieval across multiple devices of a user, the system comprising:
at least one processor; and
a memory for storing and encoding computer executable instructions that, when executed by the at least one processor is operative to:
maintain a shared working memory of the user for temporary storage of information until an occurrence of a condition;
collect data from working memories of any device associated with the user;
store the data on the shared working memory;
collect data formed utilizing world knowledge and a user centric memory graph, wherein world knowledge is other information discovered and accessed through a network connection, and wherein the world knowledge is associated with and enriches the data;
wherein the user centric memory graph links user memory elements based on relationships created in space, time, and cognitive dimensions of the user;
collect a user context;
store the data and the user context in the shared working memory;
send an update to all active devices of the of the user regarding changes to the shared working memory;
identify relevancy on the user centric memory graph based on the data and the user context to form a constrained user centric memory graph;
determine a response based the constrained user centric memory graph and the world knowledge;
compare the response to a relevancy threshold;
determine that the response meets the relevancy threshold;
send the response to all the active devices of the user and store the response in the shared working memory, upon making the determination that the response meets the relevancy threshold; and
delete the shared working memory after the occurrence of the condition.

13. The system of claim 12, wherein the condition is a time period of one day.

14. The system of claim 12, wherein the response is an unrequested memory prompt.

15. A method for intelligent memory sharing and contextual retrieval across multiple devices and multiple applications of a user, the method comprising:
maintaining a shared working memory of the user for temporary storage of information for a predetermined amount of time, during the predetermined amount of time:
collecting data from working memories of any device associated with the user;
storing the data on the shared working memory;
collecting an intelligence framework for the user;
determining world knowledge associated with the data, wherein world knowledge is other information discovered and accessed through a network connection, and wherein the world knowledge is associated with and enriches the data;
collecting a user context;
storing the data, the intelligence framework, and the user context in the shared working memory;

sending an update to all active devices of the of the user regarding changes to the shared working memory;

identifying relevant elements on the intelligence framework based on the data and the user context to form a constrained intelligence framework;

determining a response based the constrained intelligence framework and the world knowledge;

comparing the response to a relevancy threshold;

determining that the response meets the relevancy threshold; and sending the response to all the active devices of the user and store the response in the shared working memory upon making the determination that the response meets the relevancy threshold; and deleting the shared working memory after the predetermined amount of time.

16. The system of claim 15, wherein the intelligence framework is a user centric memory graph that links memory elements based on relationships created in space, time, and cognitive dimensions of the user.

17. The system of claim 15, wherein the user context is a current user location, current time, current user digital behavior, and current user physical behavior.

18. The system of claim 15, wherein the multiple applications include at least two different digital assistant applications.

19. The system of claim 15, wherein the data includes GPS coordinates, photos, browser history, emails, text messages, social data, calendar items, professional data, events, and user application data.

20. The system of claim 15, wherein the response is an unrequested memory prompt.

* * * * *